US012699529B2

(12) United States Patent
Don et al.

(10) Patent No.:  US 12,699,529 B2
(45) Date of Patent:  Aug. 4, 2026

(54) SYSTEM AND METHOD FOR STORAGE BASED PATH DISCOVERY

(71) Applicant: Dell Products L.P., Round Rock, TX (US)

(72) Inventors: Arieh Don, Newton, MA (US); Scott Rowlands, Cumming, GA (US); Alexander Izikson, Gan Yavne (IL)

(73) Assignee: Dell Products L.P., Round Rock, TX (US)

( * ) Notice: Subject to any disclaimer, the term of this patent is extended or adjusted under 35 U.S.C. 154(b) by 64 days.

(21) Appl. No.: 18/969,657

(22) Filed: Dec. 5, 2024

(65) Prior Publication Data

US 2026/0161318 A1      Jun. 11, 2026

(51) Int. Cl.
*G06F 3/06* (2006.01)

(52) U.S. Cl.
CPC .......... *G06F 3/0655* (2013.01); *G06F 3/0604* (2013.01); *G06F 3/067* (2013.01)

(58) Field of Classification Search
CPC ....... G06F 3/0655; G06F 3/0604; G06F 3/067
USPC ......................................................... 709/238
See application file for complete search history.

(56) References Cited

U.S. PATENT DOCUMENTS

| | | | | |
|---|---|---|---|---|
| 10,230,688 B1 * | 3/2019 | Subbiah | ................ | H04L 41/122 |
| 2004/0103220 A1 * | 5/2004 | Bostick | .................. | H04L 41/34 |
| | | | | 709/208 |
| 2006/0106819 A1 * | 5/2006 | Dhanadevan | ........... | H04L 43/50 |
| 2006/0114917 A1 * | 6/2006 | Raisch | .................... | H04L 63/02 |
| | | | | 370/389 |
| 2011/0029669 A1 * | 2/2011 | Chuang | ............... | H04L 43/0894 |
| | | | | 709/224 |
| 2011/0197091 A1 * | 8/2011 | Kurasawa | ........... | G06F 11/0727 |
| | | | | 714/48 |
| 2012/0259961 A1 * | 10/2012 | Winokur | ................ | G06F 3/067 |
| | | | | 709/223 |
| 2015/0138956 A1 * | 5/2015 | Hathorn | .............. | H04L 41/0668 |
| | | | | 370/227 |
| 2015/0242416 A1 * | 8/2015 | Nakano | ............... | G06F 11/3048 |
| | | | | 707/694 |

FOREIGN PATENT DOCUMENTS

CN            102694735 A  *  9/2012  ............. H04L 41/12

* cited by examiner

*Primary Examiner* — Ruolei Zong
(74) *Attorney, Agent, or Firm* — Brian J. Colandreo; Heath M. Sargeant; Holland & Knight LLP

(57)      ABSTRACT

A method, computer program product, and computing system for processing fabric device management interface (FDMI) information about one or more initiator devices from a fibre channel (FC) switch to allow a storage array to associate host bus adapter worldwide name (HBA-WWN) port information with one or more hostnames corresponding to the one or more initiator devices. The method may further include transmitting from each port available in the storage array, at predetermined intervals, a remote link service (RLS) signal to each HBA-WWN port in communication with the storage array. Further, the method may include processing a confirmation signal associated with receipt of the RLS signal at a first HBA-WWN port on a first initiator device, and in response to processing the confirmation signal, marking a successful path used to transmit the RLS signal as valid.

20 Claims, 5 Drawing Sheets

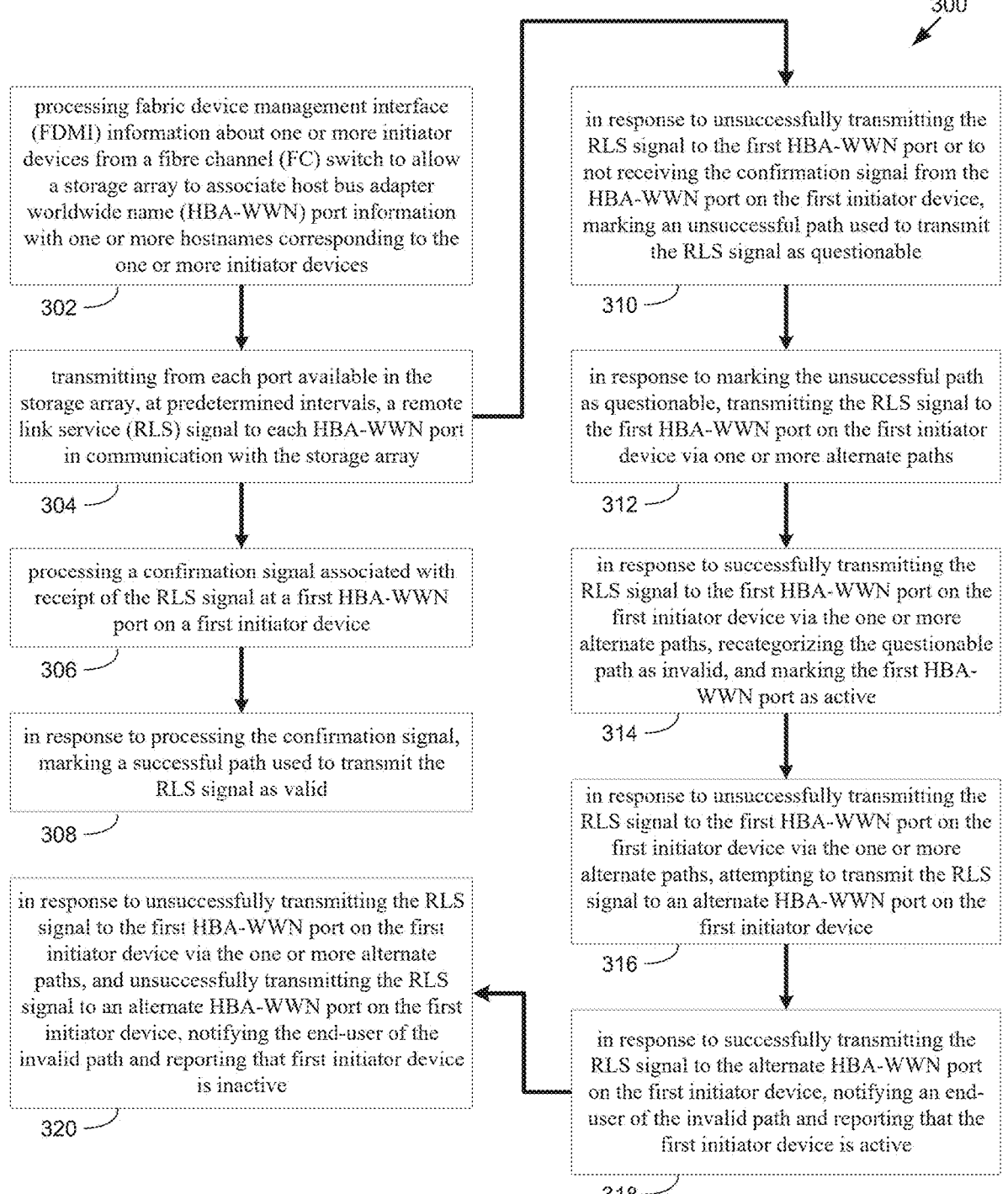

300 processing fabric device management interface (FDMI) information about one or more initiator devices from a fibre channel (FC) switch to allow a storage array to associate host bus adapter worldwide name (HBA-WWN) port information with one or more hostnames corresponding to the one or more initiator devices

302 transmitting from each port available in the storage array, at predetermined intervals, a remote link service (RLS) signal to each HBA-WWN port in communication with the storage array

304 processing a confirmation signal associated with receipt of the RLS signal at a first HBA-WWN port on a first initiator device

306 in response to processing the confirmation signal, marking a successful path used to transmit the RLS signal as valid

308 in response to unsuccessfully transmitting the RLS signal to the first HBA-WWN port on the first initiator device via the one or more alternate paths, and unsuccessfully transmitting the RLS signal to an alternate HBA-WWN port on the first initiator device, notifying the end-user of the invalid path and reporting that first initiator device is inactive

320 in response to unsuccessfully transmitting the RLS signal to the first HBA-WWN port or to not receiving the confirmation signal from the HBA-WWN port on the first initiator device, marking an unsuccessful path used to transmit the RLS signal as questionable

310 in response to marking the unsuccessful path as questionable, transmitting the RLS signal to the first HBA-WWN port on the first initiator device via one or more alternate paths

312 in response to successfully transmitting the RLS signal to the first HBA-WWN port on the first initiator device via the one or more alternate paths, recategorizing the questionable path as invalid, and marking the first HBA-WWN port as active

314 in response to unsuccessfully transmitting the RLS signal to the first HBA-WWN port on the first initiator device via the one or more alternate paths, attempting to transmit the RLS signal to an alternate HBA-WWN port on the first initiator device

316 in response to successfully transmitting the RLS signal to the alternate HBA-WWN port on the first initiator device, notifying an end-user of the invalid path and reporting that the first initiator device is active

SYSTEM AND METHOD FOR STORAGE BASED PATH DISCOVERY

BACKGROUND

Storing and safeguarding electronic content may be beneficial in modern business and elsewhere. Accordingly, various methodologies may be employed to protect and distribute such electronic content.

A distributed storage system may include a plurality of storage devices (e.g., storage arrays, storage drives, etc.) to provide data storage to a plurality of nodes. The plurality of storage devices and the plurality of nodes may be situated in the same physical location, or in one or more physically remote locations defining a storage area network (SAN). The plurality of nodes may be coupled to the storage devices by a high-speed interconnect, such as a fibre channel (FC) switch.

In a SAN environment, FC switches may receive fabric device management interface (FDMI) information about one or more connected devices as part of the data distribution process. More specifically, in FC SAN connectivity, a host bus adapter (HBA) on a host device may be assigned to a designated storage port, so that the FC switch allows the HBA port to send input-output signals (IOs) to the assigned storage port. Further, the storage port may also use a masking to define which HBA devices are allowed to communicate with devices on that port. As long as the array port receives IOs from the HBA device, then a storage array may be able to confirm that the network path is still valid and active.

At present, this ability to confirm whether network paths are still valid and active is limited. More specifically, when IOs are not being actively received along a network path, current approaches are unable to determine whether the path has been compromised, or if the host has simply stopped sending IOs to the array. This lack of clarity as to whether a network path has been compromised may cause potential misdiagnoses that waste time and resources, and ultimately have a negative impact on overall storage system performance.

SUMMARY OF DISCLOSURE

In one example implementation, a computer-implemented method executed on a computing device may include, but is not limited to, processing fabric device management interface (FDMI) information about one or more initiator devices from a fibre channel (FC) switch to allow a storage array to associate host bus adapter worldwide name (HBA-WWN) port information with one or more hostnames corresponding to the one or more initiator devices. The method may further include transmitting from each port available in the storage array, at predetermined intervals, a remote link service (RLS) signal to each HBA-WWN port in communication with the storage array. Further, the method may include processing a confirmation signal associated with receipt of the RLS signal at a first HBA-WWN port on a first initiator device, and in response to processing the confirmation signal, marking a successful path used to transmit the RLS signal as valid.

One or more of the following example features may be included. The storage array may be connected to each of the one or more initiator devices via at least one path going through the FC switch. Each HBA-WWN port may be configured to send a confirmation signal in response to receiving the RLS signal. In response to unsuccessfully transmitting the RLS signal to the first HBA-WWN port, or to not receiving the confirmation signal from the HBA-WWN port on the first initiator device, marking an unsuccessful path used to transmit the RLS signal as questionable. In response to marking the unsuccessful path as questionable, transmitting the RLS signal to the first HBA-WWN port on the first initiator device via one or more alternate paths. In response to successfully transmitting the RLS signal to the first HBA-WWN port on the first initiator device via the one or more alternate paths, recategorizing the questionable path as invalid, and marking the first HBA-WWN port as active. In response to unsuccessfully transmitting the RLS signal to the first HBA-WWN port on the first initiator device via the one or more alternate paths, attempting to transmit the RLS signal to an alternate HBA-WWN port on the first initiator device. In response to successfully transmitting the RLS signal to the alternate HBA-WWN port on the first initiator device, notifying an end-user of the invalid path and reporting that the first initiator device is active. Receiving RLS signals from the alternate HBA-WWN port may indicate that the first initiator device is active. In response to unsuccessfully transmitting the RLS signal to the first HBA-WWN port on the first initiator device via the one or more alternate paths, and unsuccessfully transmitting the RLS signal to an alternate HBA-WWN port on the first initiator device, notifying the end-user of the invalid path and reporting that first initiator device is inactive.

In another example implementation, a computer program product resides on a computer readable medium that has a plurality of instructions stored on it. When executed by a processor, the instructions cause the processor to perform operations that may include, but are not limited to, processing fabric device management interface (FDMI) information about one or more initiator devices from a fibre channel (FC) switch to allow a storage array to associate host bus adapter worldwide name (HBA-WWN) port information with one or more hostnames corresponding to the one or more initiator devices. The operations may also include transmitting from each port available in the storage array, at predetermined intervals, a remote link service (RLS) signal to each HBA-WWN port in communication with the storage array. Further, the operations may include processing a confirmation signal associated with receipt of the RLS signal at a first HBA-WWN port on a first initiator device, and in response to processing the confirmation signal, marking a successful path used to transmit the RLS signal as valid.

One or more of the following example features may be included. The storage array may be connected to each of the one or more initiator devices via at least one path going through the FC switch. Each HBA-WWN port may be configured to send a confirmation signal in response to receiving the RLS signal. In response to unsuccessfully transmitting the RLS signal to the first HBA-WWN port, or to not receiving the confirmation signal from the HBA-WWN port on the first initiator device, marking an unsuccessful path used to transmit the RLS signal as questionable. In response to marking the unsuccessful path as questionable, transmitting the RLS signal to the first HBA-WWN port on the first initiator device via one or more alternate paths. In response to successfully transmitting the RLS signal to the first HBA-WWN port on the first initiator device via the one or more alternate paths, recategorizing the questionable path as invalid, and marking the first HBA-WWN port as active. In response to unsuccessfully transmitting the RLS signal to the first HBA-WWN port on the first initiator device via the one or more alternate paths, attempting to transmit the RLS signal to an alternate HBA-WWN port on the first initiator device. In response to successfully transmitting the RLS signal to the alternate HBA-WWN port on the first initiator device, notifying an end-user of the invalid path and reporting that the first initiator device is active. Receiving RLS signals from the alternate HBA-WWN port may indicate that the first initiator device is active. In response to unsuccessfully transmitting the RLS signal to the first HBA-WWN port on the first initiator device via the one or more alternate paths, and unsuccessfully transmitting the RLS signal to an alternate HBA-WWN port on the first initiator device, notifying the end-user of the invalid path and reporting that first initiator device is inactive.

In another example implementation, a computing system includes at least one processor and at least one memory architecture coupled with the at least one processor, where the at least one processor is configured to process fabric device management interface (FDMI) information about one or more initiator devices from a fibre channel (FC) switch to allow a storage array to associate host bus adapter world-wide name (HBA-WWN) port information with one or more hostnames corresponding to the one or more initiator devices, and to transmit from each port available in the storage array, at predetermined intervals, a remote link service (RLS) signal to each HBA-WWN port in communication with the storage array. The at least one processor may be further configured to process a confirmation signal associated with receipt of the RLS signal at a first HBA-WWN port on a first initiator device, and in response to processing the confirmation signal, marking a successful path used to transmit the RLS signal as valid.

One or more of the following example features may be included. The storage array may be connected to each of the one or more initiator devices via at least one path going through the FC switch. Each HBA-WWN port may be configured to send a confirmation signal in response to receiving the RLS signal. In response to unsuccessfully transmitting the RLS signal to the first HBA-WWN port, or to not receiving the confirmation signal from the HBA-WWN port on the first initiator device, marking an unsuccessful path used to transmit the RLS signal as questionable. In response to marking the unsuccessful path as questionable, transmitting the RLS signal to the first HBA-WWN port on the first initiator device via one or more alternate paths. In response to successfully transmitting the RLS signal to the first HBA-WWN port on the first initiator device via the one or more alternate paths, recategorizing the questionable path as invalid, and marking the first HBA-WWN port as active. In response to unsuccessfully transmitting the RLS signal to the first HBA-WWN port on the first initiator device via the one or more alternate paths, attempting to transmit the RLS signal to an alternate HBA-WWN port on the first initiator device. In response to successfully transmitting the RLS signal to the alternate HBA-WWN port on the first initiator device, notifying an end-user of the invalid path and reporting that the first initiator device is active. Receiving RLS signals from the alternate HBA-WWN port may indicate that the first initiator device is active.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 3 is an example flowchart of the path discovery process of FIG. 1 according to one or more example implementations of the disclosure.

Like reference symbols in the various drawings indicate like elements.

DETAILED DESCRIPTION

System Overview

Figure 1:
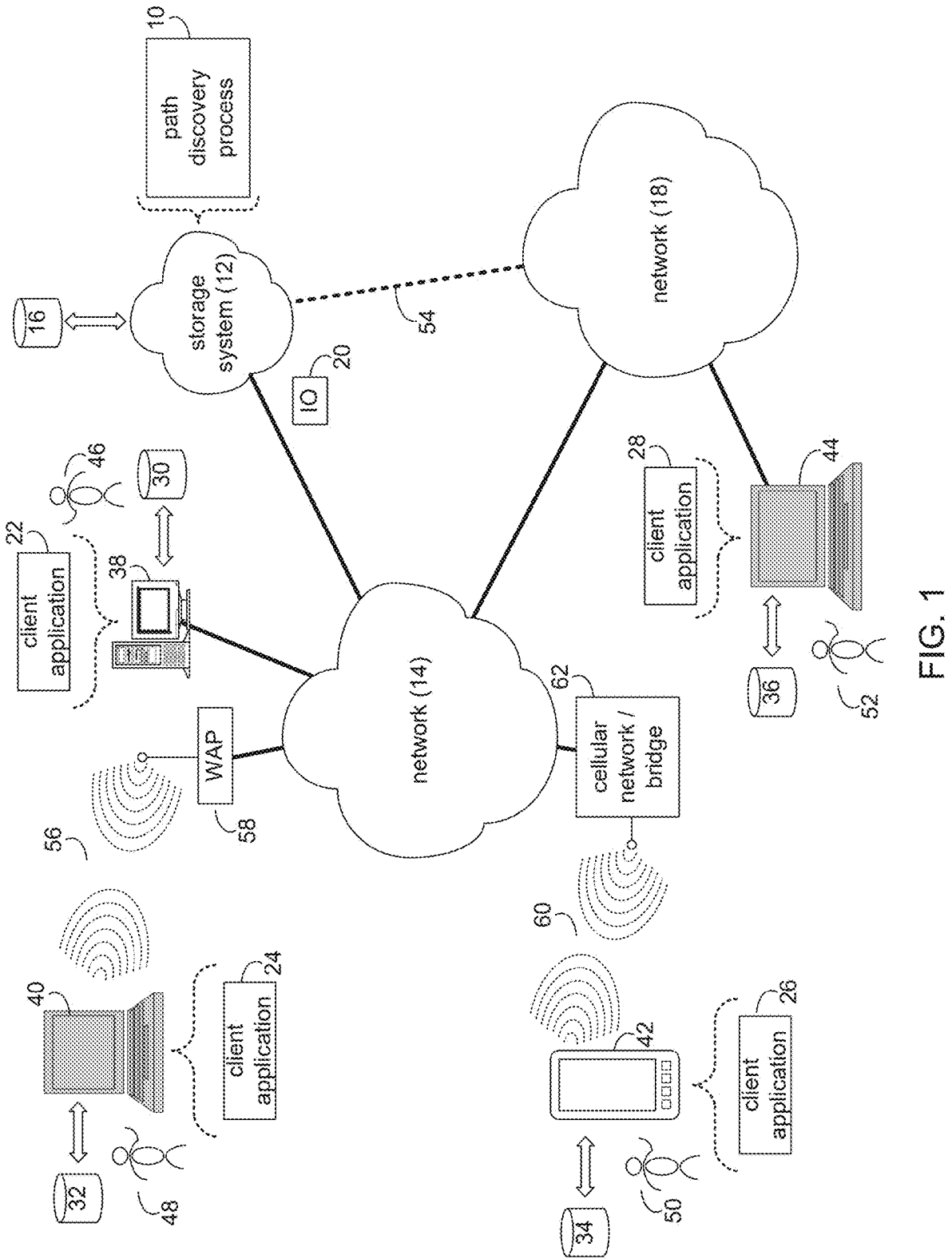
FIG. 1 is an example diagrammatic view of a storage system and a path discovery process coupled to a distributed computing network according to one or more example implementations of the disclosure.

Referring to FIG. 1, there is shown path discovery process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of path discovery process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of path discovery process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data ownership process, such as path discovery process 10 of FIG. 1, may include but is not limited to, processing fabric device management interface (FDMI) information about one or more initiator devices from a fibre channel (FC) switch to allow a storage array to associate host bus adapter worldwide name (HBA-WWN) port information with one or more hostnames corresponding to the one or more initiator devices. The method may further include transmitting from each port available in the storage array, at predetermined intervals, a remote link service (RLS) signal to each HBA-WWN port in communication with the storage array. Further, the method may include processing a confirmation signal associated with receipt of the RLS signal at a first HBA-WWN port on a first initiator device, and in response to processing the confirmation signal, marking a successful path used to transmit the RLS signal as valid.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
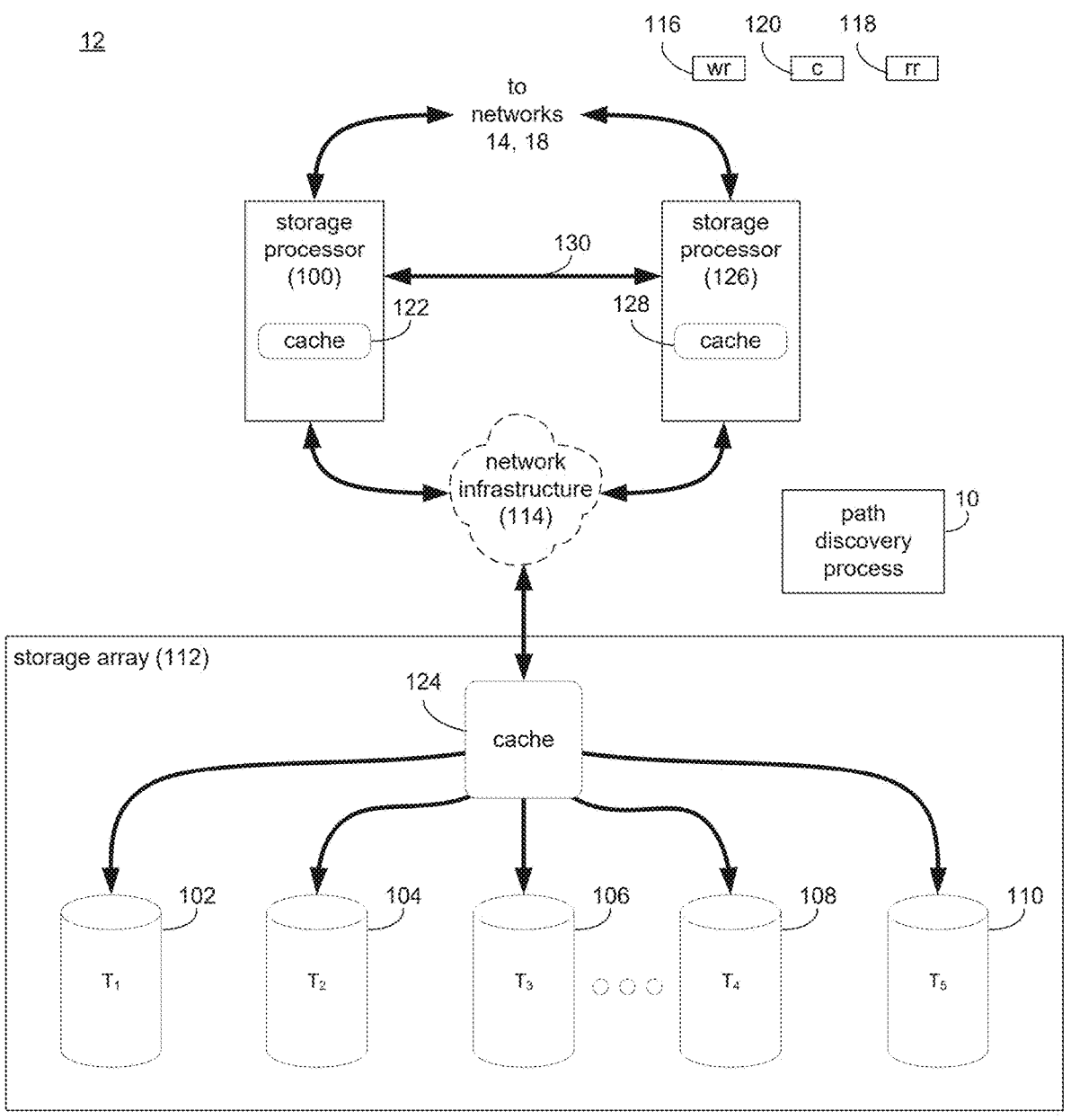
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1–n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of gearshift deduplication process 10. The instruction sets and subroutines of gearshift deduplication process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of gearshift deduplication process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content be written to storage system 12) and data read request 118 (i.e. a request that content be read from storage system 12).

During operation of storage processor 100, content 116 to be written to storage system 12 may be processed by storage processor 100. Additionally/alternatively and when storage processor 100 is configured as an application server, content 116 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 116 within frontend cache memory system 122. Depending upon the manner in which frontend cache memory system 122 is configured, storage processor 100 may immediately write content 116 to data array 112 (if frontend cache memory system 122 is configured as a write-through cache) or may subsequently write content 116 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 116 to be written to data array 112 may be received from storage processor 100. Data array 112 may initially store content 116 within backend cache memory system 124 prior to being stored on e.g. one or more of storage targets 102, 104, 106, 108, and coded target 110.

As discussed above, the instruction sets and subroutines of gearshift deduplication process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of gearshift deduplication process 10 may be executed by one or more processors (not shown) and one or more memory architectures (not shown) included within data array 112.

Further and as discussed above, during the operation of data array 112, content (e.g., content 116) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 116 to be written to storage system 12 may be processed by storage processor 126. Additionally/alternatively and when storage processor 126 is configured as an application server, content 116 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 116 within frontend cache memory system 126. Depending upon the manner in which frontend cache memory system 128 is configured, storage processor 126 may immediately write content 116 to data array 112 (if frontend cache memory system 128 is configured as a write-through cache) or may subsequently write content 116 to data array 112 (if frontend cache memory system 128 is configured as a write-back cache).

In some implementations, the instruction sets and subroutines of gearshift deduplication process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of gearshift deduplication process 10 may be executed by one or more processors (not shown) and one or more memory architectures (not shown) included within data array 112.

Further and as discussed above, during the operation of data array 112, content (e.g., content 116) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Figure 4:
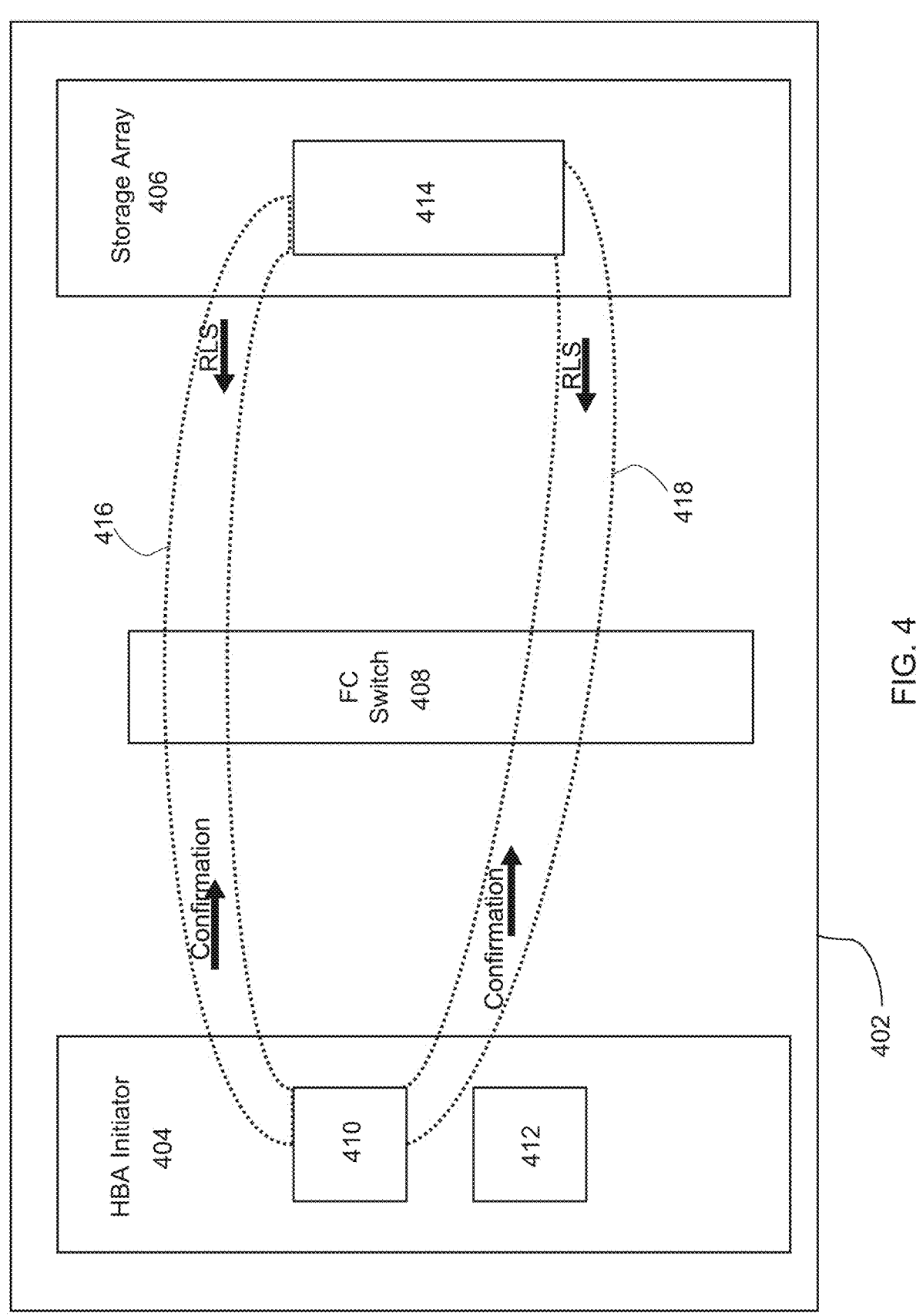
FIGS. 4-5 are example diagrammatic views of SAN environments making use of path discovery process according to one or more example implementations of the disclosure.
Figure 5:
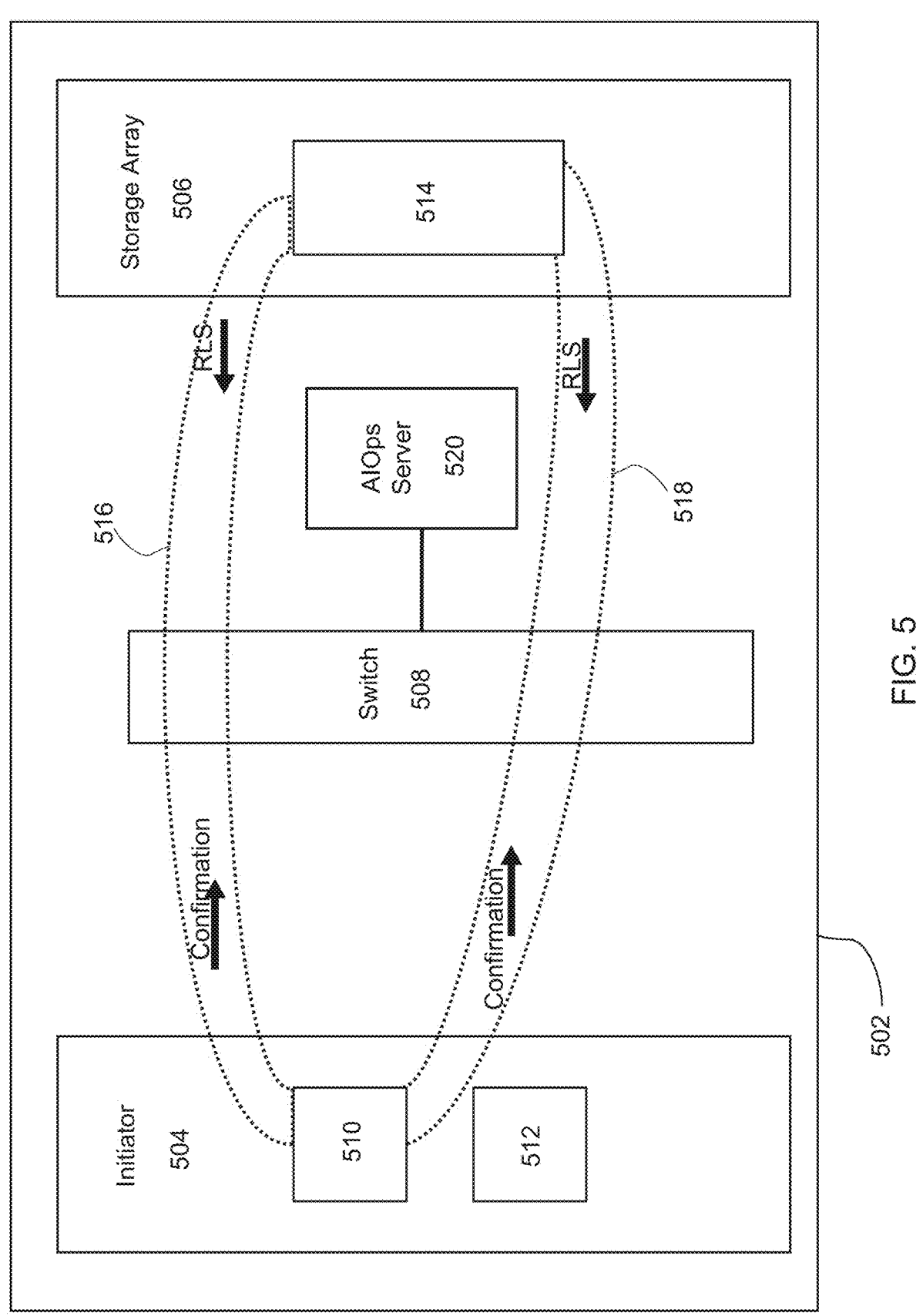

The Path Discovery Process:

Referring also to FIGS. 3-5 and in some implementations, path discovery process 10 may process (302) fabric device management interface (FDMI) information about one or more initiator devices from a fibre channel (FC) switch to allow a storage array to associate host bus adapter worldwide name (HBA-WWN) port information with one or more hostnames corresponding to the one or more initiator devices. Path discovery process 10 may transmit (304) from each port available in the storage array, at predetermined intervals, a remote link service (RLS) signal to each HBA-WWN port in communication with the storage array. Path discovery process 10 may process (306) a confirmation signal associated with receipt of the RLS signal at a first HBA-WWN port on a first initiator device, and in response to processing the confirmation signal, path discovery process 10 may mark (308) a successful path used to transmit the RLS signal as valid.

Additionally, path discovery process 10 may, in response to unsuccessfully transmitting the RLS signal to the first HBA-WWN port or to not receiving the confirmation signal from the HBA-WWN port on the first initiator device, mark (310) an unsuccessful path used to transmit the RLS signal as questionable; in response to marking the unsuccessful path as questionable, transmit (312) the RLS signal to the first HBA-WWN port on the first initiator device via one or more alternate paths; and/or in response to successfully transmitting the RLS signal to the first HBA-WWN port on the first initiator device via the one or more alternate paths, recategorize (314) the questionable path as invalid, and marking the first HBA-WWN port as active. In some implementations, path discovery process 10 may, in response to unsuccessfully transmitting the RLS signal to the first HBA-WWN port on the first initiator device via the one or more alternate paths, attempt (316) to transmit the RLS signal to an alternate HBA-WWN port on the first initiator device, in response to successfully transmitting the RLS signal to the alternate HBA-WWN port on the first initiator device, notifying (318) an end-user of the invalid path and reporting that the first initiator device is active, and in response to unsuccessfully transmitting the RLS signal to the first HBA-WWN port on the first initiator device via the one or more alternate paths, and unsuccessfully transmitting the RLS signal to an alternate HBA-WWN port on the first initiator device, notifying (320) the end-user of the invalid path and reporting that first initiator device is inactive.

In some implementations as will be discussed in greater detail below, path discovery process 10 may take advantage of fabric device management interface (FDMI) information provided by fibre channel (FC) switches. FDMI is a feature within FC networks that enables the collection and dissemination of detailed information about devices connected to the "storage fabric" (i.e., the interconnected network infrastructure that connects storage devices (e.g., disk arrays and SANs) to servers and other systems that access data stored on the storage devices). FDMI plays a critical role in modern enterprise data centers by enabling fast, reliable, and efficient data transfer between storage and computer resources. By utilizing FDMI information, administrators can gain comprehensive insights into the devices within their storage network, and thereby provide better configuration, troubleshooting, and optimization of the storage infrastructure.

In some implementations, path discovery process 10 may process (302) fabric device management interface (FDMI) information about one or more initiator devices from a fibre channel (FC) switch to allow a storage array to associate host bus adapter worldwide name (HBA-WWN) port information with one or more hostnames corresponding to the one or more initiator devices. Here, FDMI information may include information related to device attributes (e.g. device's manufacturer, model, and firmware version) and port attributes, (e.g. worldwide name (WWN), host bus adapter (HBA), supported FC classes). FDMI information may also include information about certain hardware capabilities (e.g. speeds, protocols, and other features like zoning or security options), as well as some metrics related to data transfer rates (e.g. error counts, and other performance indicators.)

Consider example 400, shown in FIG. 4, a SAN environment (e.g. SAN 402) may include an initiating device (e.g. HBA initiator 404) operatively connected to a storage array (e.g. storage array 406), via an FC switch (e.g. FC switch 408), where HBA initiator 404 may include one or more network ports (e.g. HBA-WWN ports 410 and 412) and storage array 406 may include one or more storage ports (e.g. storage port 414). When input-output signals (IOs) stop being sent from HBA-WWN port 410 on HBA initiator 404 to storage port 414 on storage array 406, storage port 414 has no way of knowing if the IOs stopped due to a user action, such as an application shutdown, or due to a hardware issue, such as a switch port malfunction on FC switch 408. Since storage arrays were first implemented, there have been numerous documented instances where a major disruption in SAN connectivity has caused multiple HBA initiators to stop communicating with storage ports. Without any administrators on the storage side being aware of the connectivity loss, such occurrences often cause "pressure" to build up on the remaining ports in the form of pending IOs and lower the overall performance of the storage system.

Path discovery process 10 leverages FDMI information to allow for storage array 406 to automatically verify whether a particular path (e.g. path 416) is still valid and the host has simply stopped sending IOs across it, or if path 416 became invalid/lost. Some path losses have a valid reason (e.g. a host shutdown) but all others are considered invalid (e.g. a hardware issue in the SAN or on the HBA, etc.). Additionally, path discovery process 10 provides a way to discover whether or not a host, such as HBA initiator 404, is connected to only one resource, such as a storage node, or if the host is connected to more than one resource. If connected to only one resource, multiple data unavailability events (DUs) may be triggered if that one resource goes down, whereas if connected to more than one resource the storage system may have the ability to withstand the loss of a single path without instigating a DU event.

Referring again to example 400 shown in FIG. 4, path discovery process 10 may further include transmitting (304) from each port available in storage array 406, at predetermined intervals, a remote link service (RLS) signal to each HBA-WWN port in communication with storage array 406, such as HBA-WWN port 410. Here, RLS signals refer to control signals exchanged between two connected devices (e.g. HBA initiator 404 and storage array 406) over a physical link. These signals facilitate communication setup, maintenance, and troubleshooting between storage devices in a network storage environment, such as SAN 402.

Path discovery process 10 may also include processing (306) a confirmation signal associated with receipt of the RLS signal at first HBA-WWN port 410 on a first initiator device (i.e. HBA initiator 404), and in response to processing the confirmation signal, marking (308) a successful path (i.e. first path 416) used to transmit the RLS signal as valid. In this example, IOs are being successfully transmitted across path 416 without issue, and path discovery process 10 is simply creating a record of the fact that, as of that moment, path 416 is still operational. If there is a subsequent need for an administrator to cross-reference timelines as part of a troubleshooting effort, then this record will serve as a reliable indicator that at least, at that point in time, path 416 was still valid and that the administrator should look elsewhere for an issue. For the time being, path discovery process 10 determines that path 416 is still operational and continues transmitting RLS signals on other paths to check their viability.

In the event that transmission of the RLS signal to first HBA-WWN port 410 across path 416 was unsuccessful or if the confirmation signal from first HBA-WWN port 410 was not received, path discovery process 10 may alternatively mark (310) path 416 as "questionable." Then in response to marking path 416 as questionable, path discovery process 10 may transmit (312) the RLS signal to first HBA-WWN port 410 on HBA initiator 404 via one or more alternate paths 418, and in response to successfully transmitting the RLS signal to first HBA-WWN port 410 on HBA initiator 404 via the one or more alternate paths 418, path discovery process 10 may recategorize (314) first path 416 from being merely "questionable" to being outright "invalid", and marking HBA-WWN port 410 as active.

In this example, the IOs being sent across first path 416 are encountering an unknown issue that is preventing them from being received by either HBA initiator 404 or storage array 406. In order to determine if first HBA-WWN port 410 on HBA initiator 404 is still operational, path discovery process 10 attempts to reach it another way. Instead of using the previously reliable first path 416, path discovery process 10 will transmit the RLS signal over one or more alternate paths 418. If any of the one or more alternate paths 418 are successful, then path discovery process 10 can confirm that first HBA-WWN port 410 on HBA initiator 404 is still operational. For an administrator attempting to troubleshoot a network issue, having this information may be useful, because it allows the administrator to rule out hardware failure as the root cause of the problem. In this example, the RLS signal is going out from storage array 406 and the confirmation signal is being sent by HBA initiator 404, so path discovery process 10 can determine that the root cause is not hardware-related on either the storage side, or the host side and the administrator can direct his/her troubleshooting efforts elsewhere.

In response to unsuccessfully transmitting the RLS signal to first HBA-WWN port 410 on HBA initiator 404 via one or more alternate paths 418, path discovery process 10 may attempt (316) to transmit the RLS signal to an alternate HBA-WWN port (i.e. second HBA-WWN port 412) on HBA initiator 404, and if successful, notify (318) an end-user that path 416 is "invalid" and reporting that HBA initiator 404 is still active. In this example, HBA initiator 404 is operational, however first HBA-WWN port 410 has been confirmed to be the root cause of the issue. Path discovery process 10 determines this root cause because the RLS signals and the confirmation signals are being successfully transmitted from storage array 406 to second HBA-WWN port 412 on HBA initiator 404. This notification allows the end-user to take corrective action in regard to first HBA-WWN port 410.

Similarly, in response to unsuccessfully transmitting the RLS signal to first HBA-WWN port 410 on HBA initiator 404 via the one or more alternate paths 418, and unsuccessfully transmitting the RLS signal to an alternate HBA-WWN port (i.e. second HBA-WWN port 412) on HBA initiator 404, path discovery process 10 may notify (320) the end-user that the one or more alternate paths 418 are invalid, and that HBA initiator 404 is inactive. In this scenario, IOs are not being transmitted at all, regardless of which path is being used or of which port on HBA initiator 404 is being sent to, and as a result path discovery process 10 determines that HBA initiator 404 is completely inactive. At this point, it will be up to the end-user to investigate further.

In some implementations, path discovery process 10 may use an external agent such as a cloud-based artificial intelligence for IT operations (AIOps) application designed to monitor and analyze the health, performance, and capacity of infrastructure components, including storage, servers, data protection, networking, hyper-converged infrastructure, and other multi-cloud services. Path discovery process 10 may make use of an external agent providing an AIOps service in place of the FDMI information provided by FC switches.

Consider example 500, shown in FIG. 5, a SAN environment (e.g. SAN 502) may include an initiating device (e.g., initiator 504) operatively connected to a storage array (e.g. storage array 506), via a standard ethernet switch (e.g.

switch 508), where initiator 504 may include one or more network ports (e.g. network interface card (NIC) ports 510 and 512) and storage array 506 may include one or more storage ports (e.g. storage port 514). If an external agent (e.g. AIOps server 520) is operatively connected to switch 508, then path discovery process 10 may be able to leverage FDMI equivalent information received from AIOps server 520 to execute an equivalent set of operations using the FDMI equivalent information. In particular, NIC ports 510 and 512 could be used in place of HBA-WWN ports 410 and 412, and TCP equivalent RLS and confirmation signals can be used to check path viability between each NIC port on initiator 504 and each storage port on storage array 506.

In some implementations having multiple storage nodes, path discovery process 10 may generate a warning notification when only one storage node remains active. This warning is useful in case the access code or subnet-mask is upgraded because the host device should be able to resume connectivity to all other storage nodes when they come back online. Further, path discovery process 10 may also generate a warning notification if a host port using multiple WWNs in the FC context, or a physical NIC using multiple IPs in the ethernet context is connected to only one node. The multiple personalities (WWNs/Ips) may make it look as if these special cases are multiple different ports where actually, it is the same physical port being used.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   processing fabric device management interface (FDMI) information about one or more initiator devices from a fibre channel (FC) switch to allow a storage array to associate host bus adapter worldwide name (HBA-WWN) port information with one or more hostnames corresponding to the one or more initiator devices;
   transmitting from each port available in the storage array, at predetermined intervals, a remote link service (RLS) signal to each HBA-WWN port in communication with the storage array;
   processing a confirmation signal associated with receipt of the RLS signal at a first HBA-WWN port on a first initiator device; and
   in response to processing the confirmation signal, marking a successful path used to transmit the RLS signal as valid.

2. The computer-implemented method of claim 1, wherein the storage array is connected to each of the one or more initiator devices via at least one path going through the FC switch.

3. The computer-implemented method of claim 1, wherein each HBA-WWN port is configured to send a confirmation signal in response to receiving the RLS signal.

4. The computer-implemented method of claim 3, further including:
   in response to unsuccessfully transmitting the RLS signal to the first HBA-WWN port or to not receiving the confirmation signal from the HBA-WWN port on the first initiator device, marking an unsuccessful path used to transmit the RLS signal as questionable;
   in response to marking the unsuccessful path as questionable, transmitting the RLS signal to the first HBA-WWN port on the first initiator device via one or more alternate paths; and
   in response to successfully transmitting the RLS signal to the first HBA-WWN port on the first initiator device via the one or more alternate paths, recategorizing the questionable path as invalid, and marking the first HBA-WWN port as active.

5. The computer-implemented method of claim 4, further comprising:
   in response to unsuccessfully transmitting the RLS signal to the first HBA-WWN port on the first initiator device via the one or more alternate paths, attempting to transmit the RLS signal to an alternate HBA-WWN port on the first initiator device; and
   in response to successfully transmitting the RLS signal to the alternate HBA-WWN port on the first initiator device, notifying an end-user of the invalid path and reporting that the first initiator device is active.

6. The computer-implemented method of claim 5, wherein receiving RLS signals from the alternate HBA-WWN port indicates that the first initiator device is active.

7. The computer-implemented method of claim 6, further comprising:
   in response to unsuccessfully transmitting the RLS signal to the first HBA-WWN port on the first initiator device via the one or more alternate paths, and unsuccessfully transmitting the RLS signal to an alternate HBA-WWN port on the first initiator device, notifying the end-user of the invalid path and reporting that first initiator device is inactive.

8. A computer program product residing on a non-transitory computer-readable medium having a plurality of instructions stored thereon which, when executed by a processor, cause the processor to perform operations comprising:
   processing fabric device management interface (FDMI) information about one or more initiator devices from a fibre channel (FC) switch to allow a storage array to associate host bus adapter worldwide name (HBA-WWN) port information with one or more hostnames corresponding to the one or more initiator devices;
   transmitting from each port available in the storage array, at predetermined intervals, a remote link service (RLS) signal to each HBA-WWN port in communication with the storage array;
   processing a confirmation signal associated with receipt of the RLS signal at a first HBA-WWN port on a first initiator device; and
   in response to processing the confirmation signal, marking a successful path used to transmit the RLS signal as valid.

9. The computer program product of claim 1, wherein the storage array is connected to each of the one or more initiator devices via at least one path going through the FC switch.

10. The computer program product of claim 1, wherein each HBA-WWN port is configured to send a confirmation signal in response to receiving the RLS signal.

11. The computer program product of claim 10, wherein the operations further comprise:

in response to unsuccessfully transmitting the RLS signal to the first HBA-WWN port or to not receiving the confirmation signal from the HBA-WWN port on the first initiator device, marking an unsuccessful path used to transmit the RLS signal as questionable;

in response to marking the unsuccessful path as questionable, transmitting the RLS signal to the first HBA-WWN port on the first initiator device via one or more alternate paths; and in response to successfully transmitting the RLS signal to the first HBA-WWN port on the first initiator device via the one or more alternate paths, recategorizing the questionable path as invalid, and marking the first HBA-WWN port as active.

12. The computer program product of claim 11, wherein the operations further comprise:

in response to unsuccessfully transmitting the RLS signal to the first HBA-WWN port on the first initiator device via the one or more alternate paths, attempting to transmit the RLS signal to an alternate HBA-WWN port on the first initiator device; and in response to successfully transmitting the RLS signal to the alternate HBA-WWN port on the first initiator device, notifying an end-user of the invalid path and reporting that the first initiator device is active.

13. The computer program product method of claim 12, wherein receiving RLS signals from the alternate HBA-WWN port indicates that the first initiator device is active.

14. The computer program product of claim 13, wherein the operations further comprise:

in response to unsuccessfully transmitting the RLS signal to the first HBA-WWN port on the first initiator device via the one or more alternate paths, and unsuccessfully transmitting the RLS signal to an alternate HBA-WWN port on the first initiator device, notifying the end-user of the invalid path and reporting that first initiator device is inactive.

15. A computing system comprising:

a memory; and a processor configured to process fabric device management interface (FDMI) information about one or more initiator devices from a fibre channel (FC) switch to allow a storage array to associate host bus adapter worldwide name (HBA-WWN) port information with one or more hostnames corresponding to the one or more initiator devices, to transmit from each port available in the storage array, at predetermined intervals, a remote link service (RLS) signal to each HBA-WWN port in communication with the storage array, to process a confirmation signal associated with receipt of the RLS signal at a first HBA-WWN port on a first initiator device, and in response to processing the confirmation signal, to mark a successful path used to transmit the RLS signal as valid.

16. The computing system of claim 15, wherein the storage array is connected to each of the one or more initiator devices via at least one path going through the FC switch.

17. The computing system of claim 15, wherein each HBA-WWN port is configured to send a confirmation signal in response to receiving the RLS signal.

18. The computing system of claim 17, wherein the processor is further configured to:

in response to unsuccessfully transmitting the RLS signal to the first HBA-WWN port or to not receiving the confirmation signal from the HBA-WWN port on the first initiator device, mark an unsuccessful path used to transmit the RLS signal as questionable;

in response to marking the unsuccessful path as questionable, transmit the RLS signal to the first HBA-WWN port on the first initiator device via one or more alternate paths; and in response to successfully transmitting the RLS signal to the first HBA-WWN port on the first initiator device via the one or more alternate paths, recategorize the questionable path as invalid, and marking the first HBA-WWN port as active.

19. The computing system of claim 18, wherein the processor is further configured to:

in response to unsuccessfully transmitting the RLS signal to the first HBA-WWN port on the first initiator device via the one or more alternate paths, attempting to transmit the RLS signal to an alternate HBA-WWN port on the first initiator device; and in response to successfully transmitting the RLS signal to the alternate HBA-WWN port on the first initiator device, notifying an end-user of the invalid path and reporting that the first initiator device is active.

20. The computing system of claim 19, wherein receiving RLS signals from the alternate HBA-WWN port indicates that the first initiator device is active.

\* \* \* \* \*